United States Patent
Ahuja et al.

(10) Patent No.: US 8,233,545 B2
(45) Date of Patent: Jul. 31, 2012

(54) RUN LENGTH ENCODING IN VLIW ARCHITECTURE

(75) Inventors: Kapil Ahuja, Bangalore (IN); Pavan V. Shastry, Bangalore (IN); Ratna M. V. Reddy, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 1349 days.

(21) Appl. No.: 11/842,224

(22) Filed: Aug. 21, 2007

(65) Prior Publication Data

US 2008/0046698 A1    Feb. 21, 2008

Related U.S. Application Data

(60) Provisional application No. 60/822,965, filed on Aug. 21, 2006.

(51) Int. Cl.
*H04N 7/12* (2006.01)

(52) U.S. Cl. .................................. 375/240.18; 375/240

(58) Field of Classification Search .................. None
See application file for complete search history.

(56) References Cited

U.S. PATENT DOCUMENTS

| 5,589,993 | A | * | 12/1996 | Naimpally | 386/314 |
| 2003/0190085 | A1 | * | 10/2003 | Lin et al. | 382/250 |

\* cited by examiner

*Primary Examiner* — Yin-Chen Shaw
*Assistant Examiner* — Brian Olion
(74) *Attorney, Agent, or Firm* — Robert D. Marshall, Jr.; Wade James Brady, III; Frederick J. Telecky, Jr.

(57) ABSTRACT

A computer implemented method of video data encoding generates a mask having one bit corresponding each spatial frequency coefficient of a block during quantization. The bit state of the mask depends upon whether the corresponding quantized spatial frequency coefficient is zero or non-zero. The runs of zero quantized spatial frequency coefficients determined by a left most bit detect instruction are determined from the mask and run length encoded. The mask is generated using a look up table to map the scan order of quantization to the zig-zag order of run length encoding. Variable length coding and inverse quantization optionally take place within the run length encoding loop.

9 Claims, 4 Drawing Sheets

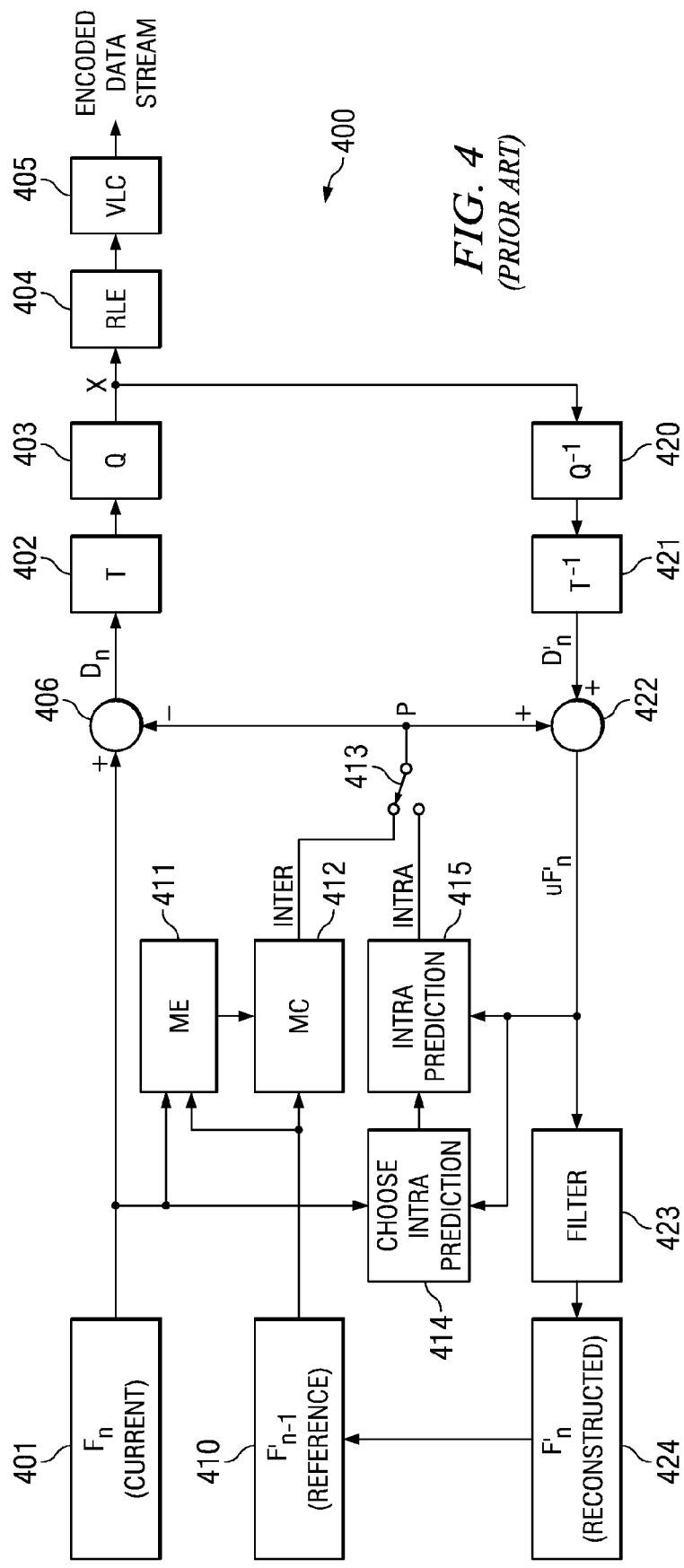

FIG. 8a
*(PRIOR ART)*

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0 | 1 | x | x | x | x | x | x | x | x | x | x | x | x | x | x | x | x | x | x | x | x | x | x | x | x | x | x | x | x | x | x |

FIG. 8b
*(PRIOR ART)*

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0 | 0 | 0 | 1 | x | x | x | x | x | x | x | x | x | x | x | x | x | x | x | x | x | x | x | x | x | x | x | x | x | x | x | x |

FIG. 8c
*(PRIOR ART)*

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

RUN LENGTH ENCODING IN VLIW ARCHITECTURE

CLAIM OF PRIORITY

This application claims priority under 35 U.S.C. 119(e)(1) to U.S. Provisional Application No. 60/822,965 filed Aug. 21, 2006.

TECHNICAL FIELD OF THE INVENTION

The technical field of this invention is video data encoding.

BACKGROUND OF THE INVENTION

Run-length encoding (RLE) is one of the simplest forms of data compression and is widely used in video data encoding. RLE is usually the third step in the data compression schemes in most video encoders. RLE is generally preceded by a de-correlating transform and quantization of the transform coefficients. After quantization, most of the coefficients become zero. The resulting sparse data is run-length encoded. In RLE, the run denotes the number of zeroes immediately preceding a level when the transform coefficients are scanned in a special zigzag order. Generally in the last stage of compression, these run-level pairs are variable length coded (e.g. Huffman coded).

Much of video coding including RLE is defined in an inherently serial manner. However many powerful digital signal processors employed in video coding, such as the Texas Instruments TMS320C6400 family of digital signal processors, employ very long instruction word (VLIW) architecture. VLIW architectures can be very efficient in exploiting instruction level parallelism in algorithms. VLIW architectures are less capable when performing serial operations. Accordingly, there is a need in the art for techniques of efficiently employing VLIW processors in RLE in video encoding.

SUMMARY OF THE INVENTION

This invention is a mask based technique which consumes only 70% of the cycles conventionally required for RLE, inverse quantization (IQ) and variable length coding (VLC) in a general video encoder. In this invention the lower the bit rate of the encoder, the greater the gain in cycles as compared to the conventional implementation.

BRIEF DESCRIPTION OF THE DRAWINGS

These and other aspects of this invention are illustrated in the drawings, in which:

FIG. 3 illustrates the instruction syntax of the very long instruction word digital signal processor integrated circuit illustrated in FIG. 1 (prior art);

FIG. 4 illustrates an overview of a video encoding process (prior art);

FIGS. 8a, 8b and 8c illustrate examples of operation of a left most bit detect instruction preferably used in this invention.

DETAILED DESCRIPTION OF PREFERRED EMBODIMENTS

Figure 1:
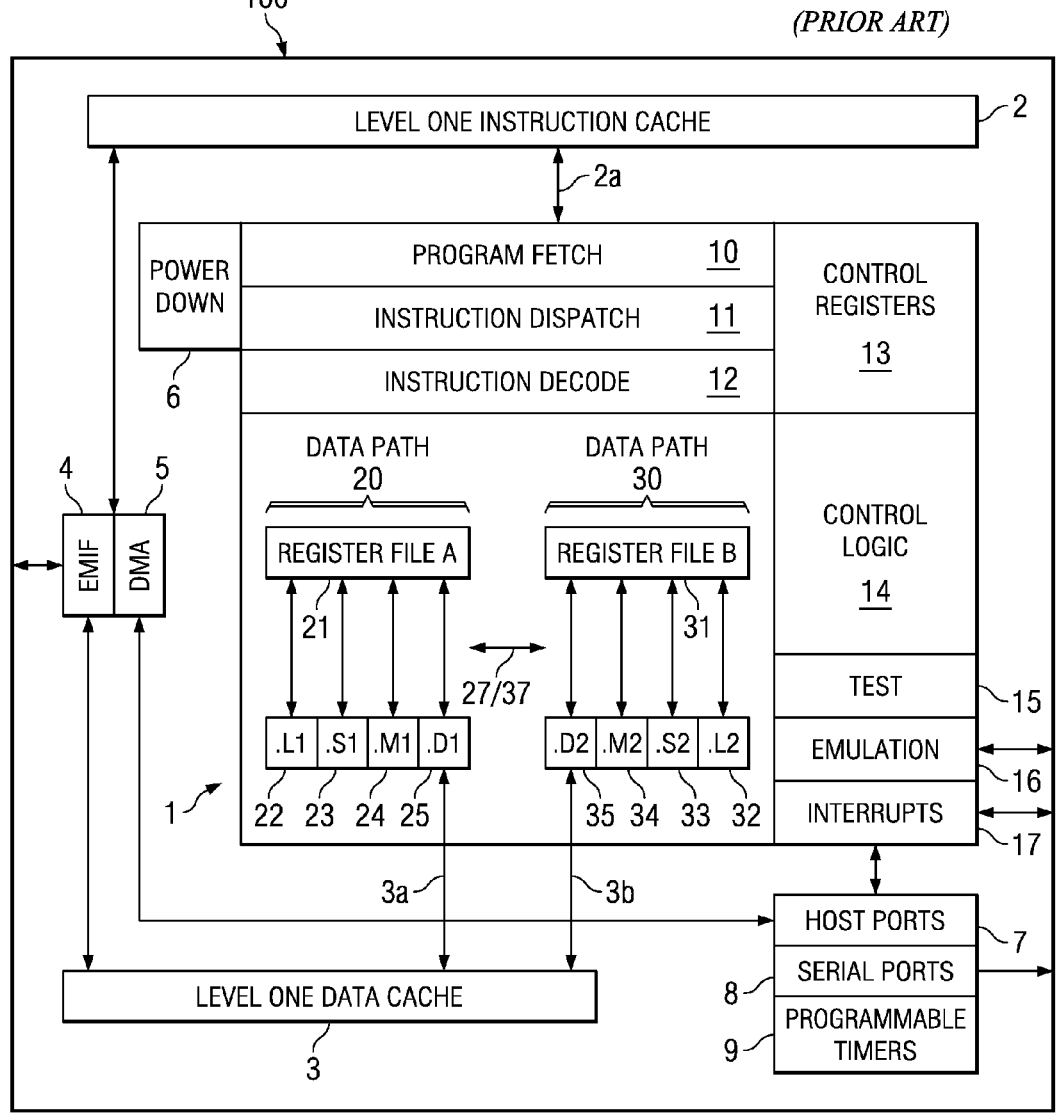
FIG. 1 illustrates details of a very long instruction word digital signal processor integrated circuit suitable for practicing this invention (prior art)

FIG. 1 is a block diagram illustrating details of a digital signal processor integrated circuit 100 suitable but not essential for use in this invention (prior art). The digital signal processor integrated circuit 100 includes central processing unit 1, which is a 32-bit eight-way VLIW pipelined processor. Central processing unit 1 is coupled to level 1 instruction cache 2 included in digital signal processor integrated circuit 100. Digital signal processor integrated circuit 100 also includes level one data cache 3. Digital signal processor integrated circuit 100 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 3 and a program space including level one instruction cache 2. When off-chip memory is used, preferably these two spaces are unified into a single memory space via the external memory interface (EMIF) 4.

Level one data cache 3 may be internally accessed by central processing unit 1 via two internal ports 3a and 3b. Each internal port 3a and 3b preferably has 32 bits of data and a 32-bit byte address reach. Level one instruction cache 2 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting limited access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 2 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 2:
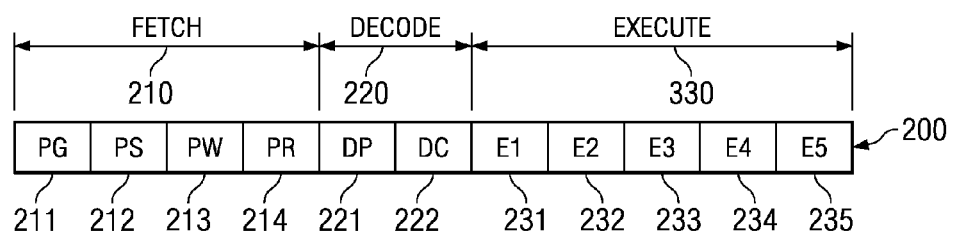
FIG. 2 illustrates the pipeline stages of the very long instruction word digital signal processor integrated circuit illustrated in FIG. 1 (prior art)

FIG. 2 illustrates the pipeline stages 200 of digital signal processor integrated circuit 100 (prior art). These pipeline stages are divided into three groups: fetch group 210; decode group 220; and execute group 230. All instructions in the instruction set flow through the fetch, decode, and execute stages of the pipeline. Fetch group 210 has four phases for all instructions, and decode group 220 has two phases for all instructions. Execute group 330 requires a varying number of phases depending on the type of instruction.

The fetch phases of the fetch group 210 are: Program address generate phase 211 (PG); Program address send phase 212 (PS); Program access ready wait stage 213 (PW); and Program fetch packet receive stage 214 (PR). Digital signal processor integrated circuit 100 uses a fetch packet (FP) of eight instructions. All eight of the instructions proceed through fetch group 210 together. During PG phase 211, the program address is generated in program fetch unit 10. During PS phase 212, this program address is sent to memory. During PW phase 213, the memory read occurs. Finally during PR phase 214, the fetch packet is received at CPU 1.

The decode phases of decode group 220 are: Instruction dispatch (DP) 221; and Instruction decode (DC) 222. During the DP phase 221, the fetch packets are split into execute packets. Execute packets consist of one or more instructions which are coded to execute in parallel. The relationship between a fetch packet and an execute packet will be explained below. During DP phase 222, the instructions in an execute packet are assigned to the appropriate functional units. Also during DC phase 222, the source registers, destination registers and associated paths are decoded for the execution of the instructions in the respective functional units.

The execute phases of the execute group 230 are: Execute 1 (E2) 231; Execute 2 (E2) 232; Execute 3 (E3) 233; Execute 4 (E4) 234; and Execute 5 (E5) 235. Different types of instructions require different numbers of these phases to complete. These phases of the pipeline play an important role in understanding the device state at CPU cycle boundaries.

During E1 phase 231, the conditions for the instructions are evaluated and operands are read for all instruction types. For load and store instructions, address generation is performed and address modifications are written to a register file. For branch instructions, branch fetch packet in PG phase 211 is affected. For all single-cycle instructions, the results are written to a register file. All single-cycle instructions complete during the E1 phase 231.

During the E2 phase 232, for load instructions, the address is sent to memory. For store instructions, the address and data are sent to memory. Single-cycle instructions that saturate results set the SAT bit in the control status register (CSR) if saturation occurs. For single cycle 16×16 multiply instructions, the results are written to a register file. For M unit non-multiply instructions, the results are written to a register file. All ordinary multiply unit instructions complete during E2 phase 222.

During E3 phase 233, data memory accesses are performed. Any multiply instruction that saturates results sets the SAT bit in the control status register (CSR) if saturation occurs. Store instructions complete during the E3 phase 233.

During E4 phase 234, for load instructions, data is brought to the CPU boundary. For multiply extensions instructions, the results are written to a register file. Multiply extension instructions complete during the E4 phase 234.

During E5 phase 235 assuming no memory stall, load instructions write data into a register. Load instructions complete during the E5 phase 235.

FIG. 3 illustrates an example of the instruction coding of instructions used by digital signal processor integrated circuit 100 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | X |

Note that "z" in the z bit column refers to the zero/not zero comparison selection noted above and "X" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 30 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Figure 5:
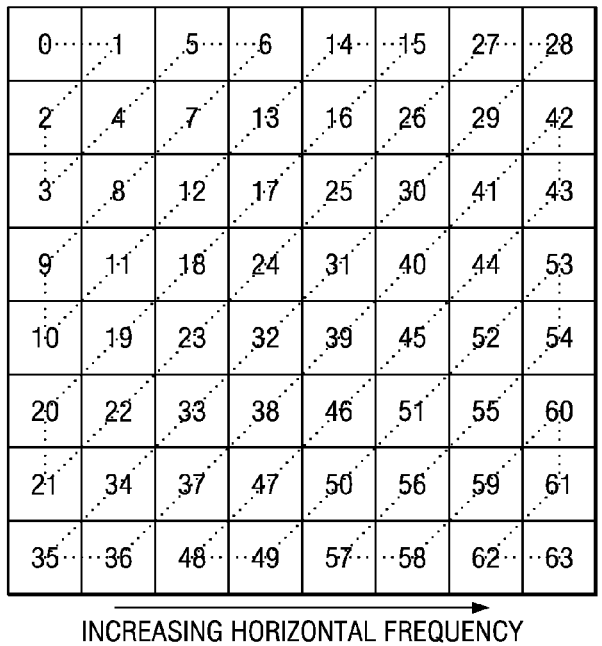
FIG. 5 shows an example of the zig-zag scanning of coefficients (prior art)

FIG. 4 illustrates the encoding process 400 of video encoding according to the prior art. Many video encoding standards use similar processes such as represented in FIG. 4. Encoding process 400 begins with the n th frame $F_n$ 401. Frequency transform block 402 transforms a macroblock of the pixel data into the spatial frequency domain. This typically involves a discrete cosine transform (DCT). This frequency domain data is quantized in quantization block 403. This quantization typically takes into account the range of data values for the current macroblock. Thus differing macroblocks may have differing quantizations. Block 404 run length encodes (RLE) the quantized data. This RLE replaces plural zero value coefficients with a run code and data corresponding to the number of such successive zero coefficients. It is conventional to arrange coefficients in the zig-zag order such as illustrated in FIG. 5 for such run length encoding. The coefficients of the frequency transformed block are expected to be sparely populated with non-zero coefficients. Run length encoding represents the expected numerous zero coefficients in fewer bits. The RLE and quantized data is encoded by variable length coding (VLC) block 405. Variable length coding employs fewer bits to encode more frequently used symbols and more bits to encode less frequency used symbols. This process reduces the amount of data that must be transmitted and/or stored. The resulting VLC data is the encoded data stream.

Video encoding standards typically permit two types of predictions. In inter-frame prediction, data is compared with data from the corresponding location of another frame. In intra-frame prediction, data is compared with data from another location in the same frame.

For inter prediction, data from n−1 th frame $F_{n-1}$ 410 and data from the current frame $F_n$ 401 supply motion estimation block 411. Motion estimation block 411 determines the positions and motion vectors of moving objects within the picture. This motion data is supplied to motion compensation block 412 along with data from frame $F_{n-1}$ 410. The resulting motion compensated frame data is selected by switch 413 for application to subtraction unit 406. Subtraction unit 406 subtracts the inter prediction data from switch 413 from the input frame data from current frame $F_n$ 401. Thus frequency transform block 402, quantization block 403, RLE block 404 and entropy encoding block 405 encode the differential data rather than the original frame data. Assuming there is relatively little change from the reference frame to the current frame, this differential data has a smaller magnitude than the raw frame data. Thus this can be expressed in fewer bits contributing to data compression. This is true even if motion estimation block 411 and motion compensation block 412 find no moving objects to code. If the current frame $F_n$ and the reference frame $F_{n-1}$ are identical, the subtraction unit 406 will produce a string of zeros for data. This data string can be encoded using few bits.

The second type of prediction is intra prediction. Intra prediction predicts a macroblock of the current frame from another macroblock of the same frame. Inverse quantization block 420 receives the quantized data from quantization block 403 and substantially recovers the original frequency domain data. Inverse frequency transform block 421 transforms the frequency domain data from inverse quantization block 420 back to the spatial domain. This spatial domain data supplies one input of addition unit 422, whose function will be further described. Encoding process 400 includes choose intra predication unit 414 to determine whether to implement intra prediction. Choose intra prediction unit 414 receives data from current frame $F_n$ 401 and the output of addition unit 422. Choose intra prediction unit 414 signals intra prediction intra predication unit 415, which also receives the output of addition unit 422. Switch 413 selects the intra prediction output for application to the subtraction input of subtraction units 406 and an addition input of addition unit 422. Intra prediction is based upon the recovered data from inverse quantization block 420 and inverse frequency transform block 421 in order to better match the processing at decoding. If the encoding used the original frame, there might be drift between these processes resulting in growing errors.

Encoding process 400 includes reconstruction of the frame based upon this recovered data. The output of addition unit 422 supplies deblock filter 423. Deblock filter 423 smoothes artifacts created by the block and macroblock nature of the encoding process. The result is reconstructed frame $F'_n$ 424. As shown schematically in FIG. 4, this reconstructed frame $F'_n$ 424 becomes the next reference frame $F_{n-1}$ 410.

FIG. 5 shows an example the zig-zag scanning step 500 for an 8 by 8 block. The quantized coefficients are read out in a zig-zag order starting from the DC component to the highest frequency component. RLE is used to code the string of data from the zig-zag scanner. Run length encoding codes the coefficients in the quantized block into a run length or number of occurrences and a level or amplitude. In this invention the RLE coding primarily focuses on zero coefficient data. The quantized data is expected to be sparsely populated with non-zero coefficients. Most of these non-zero coefficients are expected to be at lower spatial frequencies which are first scanned in this zig-zag order. Thus this zig-zag scanning typically results in long runs of zero coefficients at the higher spatial frequencies. An end-of-block or last code symbol typically denotes the last data point.

In conventional video encoders, the quantized transform coefficients are directly fed to RLE 404 as illustrated in FIG. 4. RLE 404 iterates for the number of times equal to the total number of coefficients in the block including non-zero and zero coefficients. Consider the case of computing the run-level pairs for an 8 by 8 block. Such an 8 by 8 block includes 64 coefficients. Conventionally a RLE loop iterates 64 times to generate the run-level pairs for the block. In the RLE loop, a counter is used to keep track of number of zeros before a non-zero coefficient is seen. Each time a non-zero coefficient is seen, this counter is reset to 0. The run-level pairs are then passed on to VLC block 405. VLC block 405 conventionally uses Huffman tables to code these run-level pairs.

In the prior art approach, inverse quantization 420 of the transformed coefficients can be implemented as separate module or can be combined with quantization or the RLE loop. The conventional approach of iterating the RLE loop over all the transform coefficients includes some serious drawbacks. The RLE loop has to parse each transform coefficient for generating the run-length pairs. In the prior art the RLE loop must iterate 64 times for an 8 by 8 block. In RLE loop only performs useful operation in determining whether a coefficient is zero or non-zero, and if a particular coefficient is non-zero, the number of zeros immediately preceding that particular level. Typically, there are only 8 to 10 non-zero coefficients in 8 by 8 block for high bit rate case and 4 to 6 non-zero coefficients in low bit-rate case. Since the quantization loop already iterated over all the 64 coefficients, running the RLE loop again 64 times is inefficient in cycles consumed. Ideally, the algorithm should iterate for only the number of times as the number of non-zero coefficients.

The inverse quantization (IQ) 420 also suffers from a similar drawback. In all conventional techniques, the inverse quantization loop iterates 64 times for an 8 by 8 block. Since the algorithm needs only to inverse-quantize the non-zero coefficients and initialize the other coefficients to zero, iterating over all coefficients consumes unnecessary cycles. Combining the inverse quantization loop along with the quantization or RLE loop, does not circumvent this problem. As with RLE, the inverse quantization loop should only iterate for non-zero coefficients and set all remaining coefficients to zero.

The conventional approach also rules out the option of combining RLE 404 with VLC 405. The inputs to VLC 405 are run-level pairs. The conventional VLC loop iterates only as many times as the number of non-zero coefficients. These two prior art loops cannot be combined since the RLE loop iterates 64 times irrespective of the number of non-zero levels. An advantage of combining these loops is not processing a redundant load/store of run-length pairs. The convention algorithm computes run-length in RLE 404 and pass this data in an array to VLC 405. Combining both loops eliminates the need to store the run-level pairs. This reduces the number of load/store instructions and also saves the array buffer required for keeping these run-level pairs.

Ideally RLE 404 and IQ 420 loops iterate only for as many times as the number of non-zero transform coefficients. This invention achieves this goal as detailed below.

Figure 6:
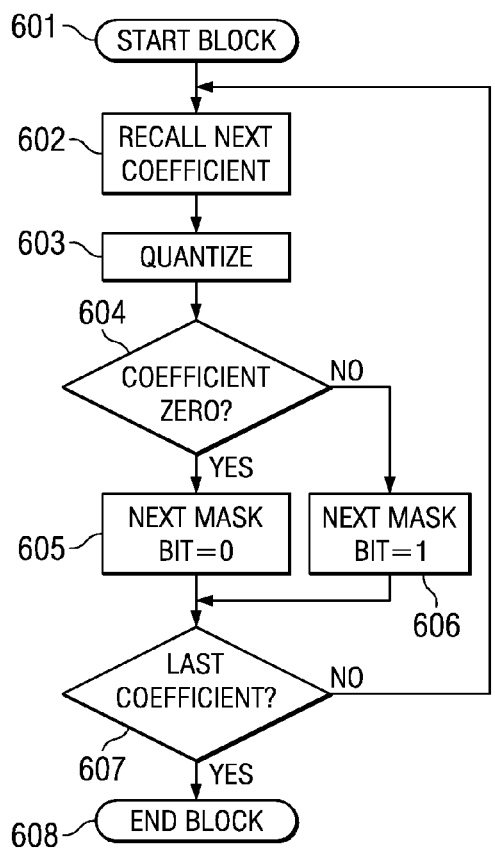
FIG. 6 illustrates a new quantization routine used in this invention.

FIG. 6 illustrates a new quantization routine used in this invention. The quantization routine iterates over all the coefficients producing quantized DCT values. These resulting quantized DCT values are run-length encoded in other aspects of this invention. Because quantization is performed over all the transform coefficients, it is redundant to iterate over the zero quantized coefficients in the RLE and IQ operations.

The quantization of this invention begins at start block 601. Processing block 602 considers the next coefficient in the current block. In the case of initial operation on a new block, this next coefficient is the first coefficient. Processing block 603 quantizes this next coefficient according to a current quantization table in a manner known in the art. The exact nature of this quantization is beyond the scope of this invention.

Test block 604 determines if the just quantized coefficient is zero. If the just quantized coefficient is zero (Yes at test block 605), the processing block 605 sets a next mask bit equal to zero. If the just quantized coefficient is not zero (No at test block 605), the processing block 606 sets a next mask bit equal to one. This invention generates a mask pattern in the quantization module having a number of elements equal to the number of coefficients in the block under consideration. This example uses 8 by 8 blocks that have 64 coefficients. This requires a 64-bit mask. The mask enables the later RLE and IQ loops to iterate for only non-zero coefficients.

Test block 607 determines if the current coefficient is the last coefficient in the current block. If this is not the last coefficient in the current block (No at test block 607), flow returns to processing block 602 to consider the next coefficient. If this is the last coefficient in the current block (Yes at test block 607), quantization ends at end block 608. Note that the process illustrated in FIG. 6 must be repeated for each block of each frame encoded.

This invention generates the mask with the minimum number of cycle overheads. The mask generation is included in the quantization loop as illustrated in FIG. 6. This avoids a separate loop used only for mask generation.

This invention includes a novel look-up-table based approach for the mask generation. The iteration for quantization shown in FIG. 6 typically operates on coefficients in a raster scan order. As previously noted, the RLE process considers coefficients in a zig-zag order such as illustrated in the example of FIG. 5. This invention uses a look-up-table (LUT) for the mask generation. This LUT is indexed into using the loop counter of the quantization loop. The mask is initialized with all "0's" upon start of a video block. Each LUT read returns a 64 bit pattern having a "1" only in the position that corresponds to the zigzag scan position of the index that was used to read the LUT. The pattern returned from the LUT is ORed with the running mask (processing block 606) only if the corresponding coefficient is non-zero. If the coefficient is zero, the pattern returned by the LUT is not ORed with the running mask (processing block 605). This process repeats for all the coefficients to produce the final 64-bit mask. This 64-bit mask captures the runs and level positions for an 8 by 8 block in the zig-zag order used by the RLE.

Figure 7:
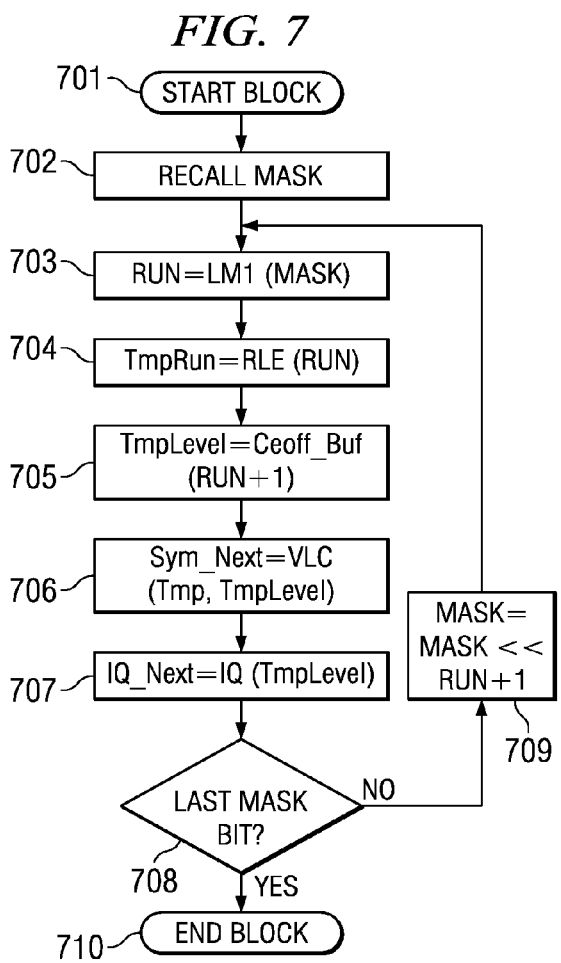
FIG. 7 illustrates a combined run length encoding, variable length coding and inverse quantization routine according to this invention.

FIG. 7 illustrates a combined RLE, VLC and IQ according to this invention. The combined operation begins at start block 701. Processing block 702 recalls the corresponding mask generated during quantization as illustrated in FIG. 6.

Processing block 703 detects the position of the left most one bit in the mask. The Texas Instruments TMS320C6400 family of digital signal processors includes a left most bit detect (LMBD) instruction which may be used in processing block 703. The LMBD instruction returns a number in the destination register dst dependent upon parsing data in the second source register src2. The type of bit detected depends upon the state of the least significant bit in the first source register src1 or the 5-bit constant cst. If this least significant bit is "0", the instruction searches for a "0" bit in src2. If this least significant bit is "1", the instruction searches for a "1" in scr2. The data returned to the destination register dst is the number of bits to the left of the detected bit.

FIGS. 8a, 8b and 8c illustrate scr2 data for some examples of the operation of the LMBD instruction. For the example of FIG. 8a, the least significant bit of src1 is "0". Thus the LMBD instruction searches for a "0" bit. In FIG. 8a the left most bit (most significant bit 31) is "0". Thus there are no zeroes to the left of the left most zero. Accordingly, the LMBD instruction will return data equal to zero. In FIG. 8b the least significant bit of src1 is "1" calling for a search for "1". Bit 27 is the left most "1" in FIG. 8b with four bits to the left of this bit. Thus the LMBD instruction returns data equal to 4. In FIG. 8c the least significant bit of scr1 is "0" calling of a search for "0". There are no zeros in scr2. Thus there are 32 bits to the left of the left most zero and the LMBD instruction will return data equal to 32.

Processing block 703 preferably use this LMBD instruction with least significant bit of scr1 equal to "1". Thus the data returned is the number of most significant "0" bits in the mask. Thus the result of the LMBD instruction is the number of preceding zero coefficients before a non-zero coefficient quantized coefficients (i.e. RUN). Processing block 704 sets a temporary variable TmpRun equal to the run length encoding (RLE) of this number of zeros. Note there must be special provisions made to skip the symbol generation of processing block 704 if the run length returned by processing block 703 is zero.

Processing block 705 sets the temporary variable TmpLevel equal to the next coefficient in the coefficient buffer Corff_Buf. This next coefficient is indexed by the sum of Run from processing block 703 and one. According to the LMBD determination of processing block 703, this coefficient has a "1" in the corresponding mask location and thus is non-zero. Processing block 706 sets the next symbol variable Sym_Next equal to the VLC of TmpLevel and TmpRun. Processing block 707 sets a next inverse quantization variable IQ_Next equal to the inverse quantization of this non-zero coefficient stored in TmpLevel. Preferably an array of inverse quantization values is initialized as all zeros. Each operation of processing block 707 replaces one of these initially zero values with a computed inverse quantization. Note that the storage of IQ_Next must take into account the coefficient location corresponding to the current mask bit.

Test block 708 determines if the current mask bit is the last mask bit. This technique performs RLE, VLC and IQ based upon data in each bit of the mask starting with the most significant mask bit. Test block 708 determines if the loop performing these processes is complete. This determination could be made based upon the number of "1" bits in the mask. The quantization process of FIG. 6 could be modified to count these "1" bits in the mask as they are formed. Such a "1" bit count would be initialized at zero for each new video block and incremented for each "No" branch of text block 604. This number of "1" bits in the mask could optionally be determined upon initialization of the process of FIG. 7. Alternatively, subtracting the shift amount of block 709 from the original size of the mask yields the number of mask bits not yet considered. The loop is complete when this number equals zero.

If the current mask bit is not the last mask bit (No at test block 708), then the mask is left shifted by one more than the last determined run length in processing block 709. The left most one detect of processing block 703 counted all most significant zeros in the mask. The next bit is a "1" from the determination of processing block 703. Thus the next most significant mask bit not yet considered is shifted to the most significant bit position by a left shift operation of this amount. Following the shift of processing block 709 flow returns to processing block 703 to perform another left most one detect.

If the current mask bit is the last mask bit (Yes at test block 708) as determined by the count of "1" bits in the original mask or by the sum of the shift amounts, then the block is complete and ends at end block 710.

This invention iterates only for original quantized coefficients that were non-zero as marked by a "1" bit in the mask. The run length for runs of zero coefficients is determined by a left most one detect. This avoids running the RLE loop for the zero coefficients, thus saving a huge number of cycles.

Combining RLE with IQ also saves cycles by not performing inverse quantization on zero coefficients. The RLE process notes the position of non-zero coefficients. Using this information this invention inverse quantizes only the coefficients at those positions and initializes the remaining coefficients to zero. In addition RLE and VLC loops can be combined because both the loops iterate the same number of times. This saves the redundant load/store instructions and the buffer required to hold the run-level pairs. According to a preferred embodiment of this invention RLE, IQ and VLC are merged into a single loop for the inter flow. For the intra flow, RLE and IQ are merged together in the preferred embodiment but VLC is kept separate. This is necessary because the DC coefficient in the intra macro block is coded differently from the other coefficients.

With this approach, the RLE, IQ and VLC processes for one non-zero coefficient use 9 cycles for the inter case. For the intra case, the same processes use 12 cycles for each non-zero coefficient. For intra blocks the RLE, IQ and VLC loop preferably runs continuously to encode the run-levels for all the six blocks in a macro block. The VLC intra loop preferably also runs continuously to encode all six blocks in a macroblock. For intra coding the RLE and IQ iterate at an 8 by 8 block level. Thus each intra macro block has an inner loop that iterates over an 8 by 8 block, enclosed in an outer loop that runs 6 times.

Table 2 shows results for two test cases comparing the prior art encoding and the invention encoding. The results are from experimentation on a cycle accurate simulator for the Texas Instruments TMS320C6400 family of digital signal processors such as illustrated in FIGS. 1, 2, 3 and 8 running MPEG4 Encoder.

TABLE 2

| Test case | Car phone—QCIF (Cycles/frame for Q, RLE, IQ, VLC) | Foreman—VGA (Cycles/frame for Q, RLE, IQ, VLC) |
|---|---|---|
| Cycles used in prior art | 210345 | 2426913 |
| Cycles used in invention | 130000 | 841027 |
| Percentage Improvement | 38.2% | 40.6% |

Note that the comparisons for Table 2 include cycles to perform quantization. As shown in FIG. 6, this invention requires processor cycles in the modified quantization loop. Thus Table 2 shows the net savings including these additional cycles in the quantization of this invention.

This invention saves processing cycles when the RLE, VCL and IQ processes do not have to iterate on zero coefficients following quantization. Thus this invention provides greater advantage when the encoder bit rate is lower and fewer non-zero coefficients remain following quantization.

What is claimed is:

1. A computer implemented method of video data encoding, the computer operable to perform a left most bit detect instruction, the left most bit detect instruction storing in a destination register a number of consecutive bits of a first digital state in high order bits of data stored in a source register, the method comprising the steps of:
  quantizing spatial frequency coefficients for each block of a frame;
  generating a mask having one bit for each spatial frequency coefficient of the block, each mask bit having a first digital state if a corresponding quantized spatial frequency coefficient is non-zero and a second digital state opposite to said first digital state if the corresponding quantized spatial frequency coefficient is zero; and
  run length encoding said quantized spatial frequency coefficients by storing said mask in a first data register and repeatedly
    performing a left most bit detect instruction to determine a number of bit positions in said first data register storing said mask more significant than a most significant bit having said first digital state and storing a result in a second data register,
    run length encoding zero coefficients with a run length equal to said determined number of bit positions stored in said second data register,
    left shifting said first data register storing said mask a number of bit positions one more than said determined number of bit positions stored in said second data register, until all bits having the first digital state within said first data register storing said mask are considered.

2. The computer implemented method of claim 1, wherein:
said first digital state is "1"; and
said second digital state is "0".

3. The computer implemented method of claim 1, wherein:
said steps of quantizing spatial frequency coefficients and generating said mask include iterating over each spatial frequency coefficient of the block by
quantizing a current spatial frequency coefficient according to a current quantization table,
determining whether said quantized spatial frequency coefficient is zero,
if said quantized spatial frequency coefficient is not zero, setting a corresponding mask bit to said first digital state, and
if said quantized spatial frequency coefficient is zero, setting a corresponding mask bit to said second digital state.

4. The computer implemented method of claim 3, wherein:
said step of quantizing spatial frequency coefficients iterates over said block in a raster scan order;
said step of run length encoding said quantized spatial frequency coefficients iterates over said block in a zig-zag order from least spatial frequency to greatest spatial frequency; and
said steps of quantizing spatial frequency coefficients and generating said mask include
initializing said mask to all bits of said second digital state upon starting each block,
generating a look up table indexed according to said raster scan order of a spatial frequency coefficient, each look up table entry consisting of a single bit of said first digital state at a location within said entry corresponding to the zig-zag order of said corresponding spatial frequency coefficient and all other bits in said look up table entry in said second digital state,
said step of setting a corresponding mask bit to said first digital state includes
recalling a look up table entry as indexed by said current spatial frequency coefficient, and
ORing a current mask bit with said recalled look up table entry to form a next mask bit, and
said step of setting a corresponding mask bit to said second digital state includes setting a next mask bit to said current mask bit unchanged.

5. The computer implemented method of claim 1, wherein:
said steps of quantizing spatial frequency coefficients and generating said mask include counting non-zero quantized spatial frequency coefficients; and
said step of run length encoding said quantized spatial frequency coefficients repeats a number of times equal to said count of non-zero quantized spatial frequency coefficients.

6. The computer implemented method of claim 1, wherein:
said step of run length encoding said quantized spatial frequency coefficients includes
summing said number of bit positions of said left shifts, and
repeats until said sum of said number of bit positions of left shifts equals a size of said mask.

7. The computer implemented method of claim 1, wherein:
said step of run length encoding said quantized spatial frequency coefficients further includes within each repeat variable length encoding each set of run length encoding zero coefficients.

8. The computer implemented method of claim 7, wherein:
said step of run length encoding said quantized spatial frequency coefficients further includes within each repeat variable length encoding each quantized spatial frequency coefficient immediately following each set of run length encoded zero coefficients in said zig-zag order.

9. The computer implemented method of claim 1, wherein:
said step of run length encoding said quantized spatial frequency coefficients further includes within each repeat inverse quantizing each quantized spatial frequency coefficient immediately following each set of run length encoded zero coefficients in said zig-zag order.

* * * * *